United States Patent [19]

Goloff

[11] 4,079,661
[45] Mar. 21, 1978

[54] PISTON CONSTRUCTION

[75] Inventor: Alexander Goloff, East Peoria, Ill.

[73] Assignee: Caterpillar Tractor Co., Peoria, Ill.

[21] Appl. No.: 693,234

[22] Filed: Jun. 4, 1976

[51] Int. Cl.² ............................ B23P 15/10; F16J 1/00
[52] U.S. Cl. ............................. 92/222; 29/156.5 R;
29/527.6; 92/208; 164/109; 277/189.5
[58] Field of Search ................ 92/208, 216, 219, 222,
92/257, 256; 277/189.5; 29/156.5, 527.6;
164/108, 109, DIG. 8

[56] References Cited
U.S. PATENT DOCUMENTS

| 2,349,919 | 5/1944 | Starr | 92/257 |
| 2,792,265 | 5/1957 | Lilleman | 92/256 X |
| 2,851,317 | 9/1958 | Greifenstein | 277/188 |
| 2,978,284 | 4/1961 | Daub | 92/222 |
| 3,277,797 | 10/1966 | Tyree, Jr. et al. | 92/222 |
| 3,321,824 | 5/1967 | Porkess et al. | 29/156.5 |
| 3,533,329 | 10/1970 | Galli | 29/527.6 |

FOREIGN PATENT DOCUMENTS

| 558,562 | 1/1944 | United Kingdom | 277/189.5 |
| 585,284 | 2/1947 | United Kingdom | 277/189.5 |

Primary Examiner—Irwin C. Cohen
Attorney, Agent, or Firm—Wegner, Stellman, McCord, Wiles & Wood

[57] ABSTRACT

An improved piston construction comprising a piston body having a crown and a depending skirt, a peripheral groove about the body intermediate the crown and the skirt closely adjacent the crown, a grooved insert band in the groove and adapted to receive at least one piston ring, and at least one frustoconical washer in the groove abutting the insert band on the side thereof closest the crown, the washer having its minor base directed toward the skirt and its major base directed toward the crown and being stressed into a substantially planar configuration to store energy to tightly clamp the insert band within the groove to preclude loosening of the band during operation of an engine employing the piston. Also disclosed is a method of fabricating the improved piston construction.

12 Claims, 5 Drawing Figures

U.S. Patent  March 21, 1978  4,079,661
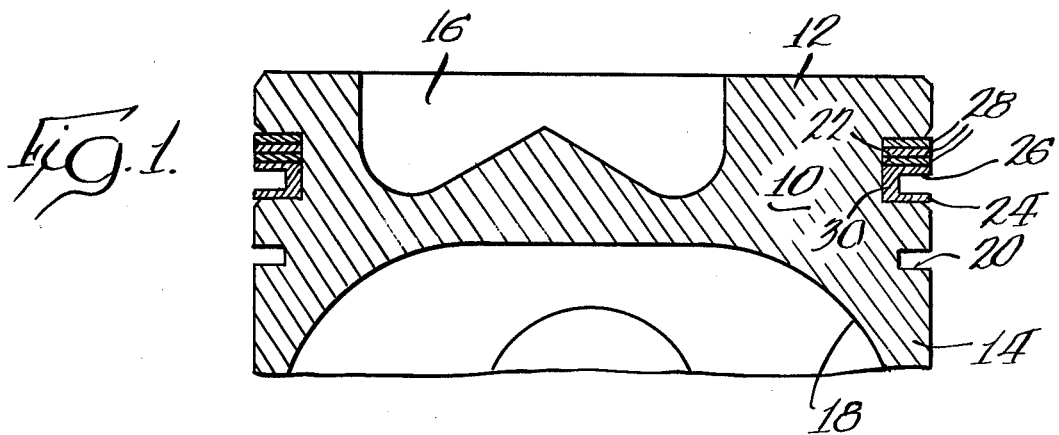
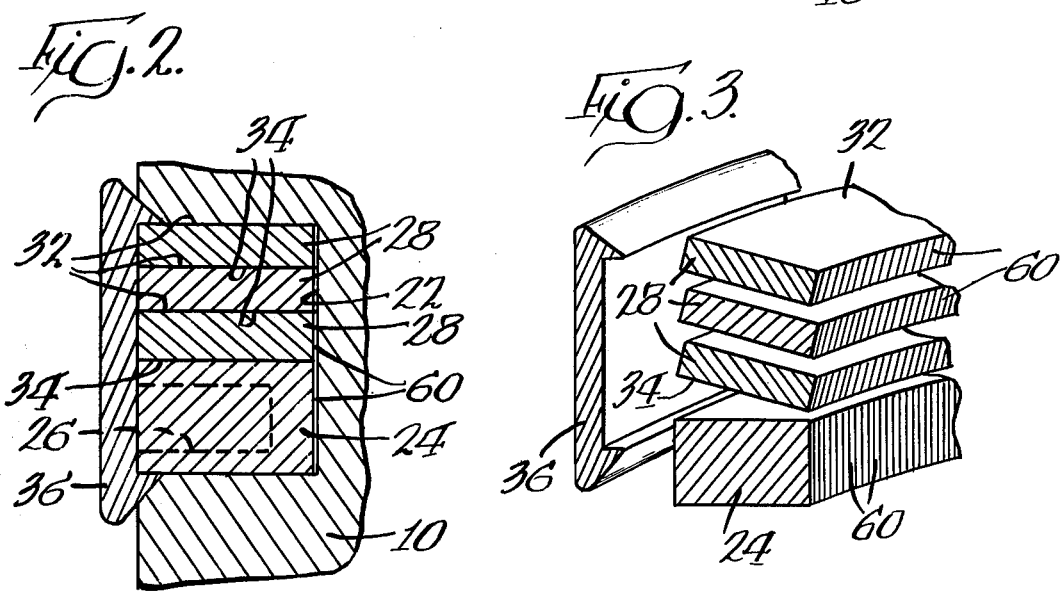
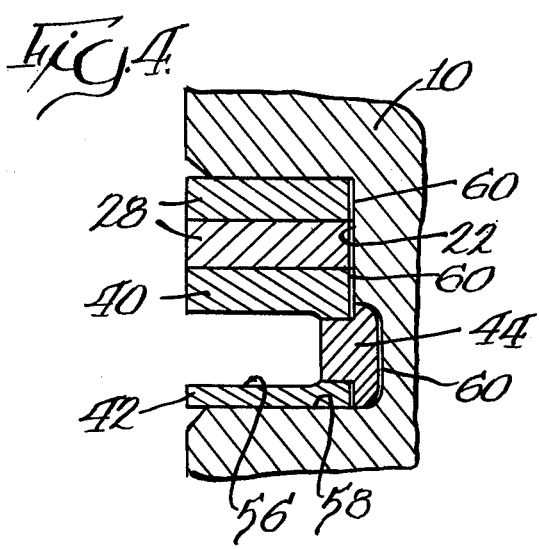
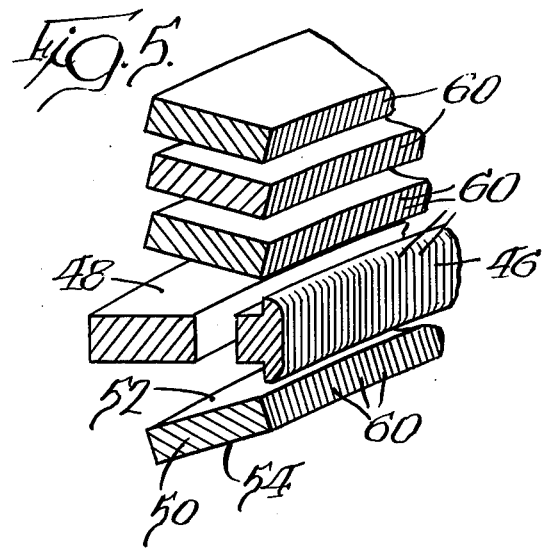

PISTON CONSTRUCTION

BACKGROUND OF THE INVENTION

This invention relates to improved piston constructions, and more specifically, to improved means for stressing ring band inserts in pistons to preclude their loosening during operation of an engine employing such pistons.

Prior art of possible relevance includes U.S. Pat. Nos. 2,349,919 issued May 30, 1944 to Starr; and 3,321,824 issued May 30, 1967 to Porkess et al.

Many engines today, particularly those using pistons formed of light weight metals, such as aluminum, employ ring groove band inserts formed of significantly harder metals for receipt of one or more compression rings.

In some constructions, the ring groove band insert is cast in place and generally is formed of a high nickel content iron or some other hard material having a coefficient of thermal expansion approximating that of the lighter, piston body. The fabrication of such pistons requires carefully controlled casting techniques to assure good bonding of the insert to the piston body and ultrasonic inspection is generally required to check the bond. Nonetheless, there is a tendency of the insert to loosen from the piston body which can result in piston failure.

Other techniques have also been employed. For example, in the above identified Starr patent, a threaded retainer, with or without a washer is employed to hold the insert in place.

In the above identified Porkess et al patent, it is suggested that a washer be employed as a wearing surface on one side of a groove for receipt of a piston ring. However, fairly complicated rolling techniques are required to provide the desired configuration of the washer within the groove.

SUMMARY OF THE INVENTION

It is the principal object of the invention to provide a new and improved piston construction embodying ring groove band inserts. More specifically, it is an object of the invention to provide such a piston construction wherein energy is stored in piston components and directed towards an insert to tightly hold the same in place to eliminate any tendency of the same to loosen up.

An exemplary embodiment of the invention achieves the foregoing object in a structure including a piston body having a crown and a depending skirt. A peripheral groove extends about the body intermediate the crown and the skirt in close adjacency to the crown. A grooved insert band is disposed in the groove and is adapted to receive at least one piston ring. At least one frusto-conical washer is located in the groove abutting the insert band on the side thereof closest to the crown. The washer has its minor base directed toward the skirt and its major base directed toward the crown and is stressed toward a planar configuration to store energy to tightly clamp the insert band within the groove.

In a highly preferred embodiment, plural ones of the washers, all similarly oriented, are employed.

In one embodiment of the invention, the insert band is a unitary structure. In another embodiment of the invention, the insert band is defined by two additional frusto-conical washers and an interposed spacer. One of the additional washers is oriented in the groove identically to the first-mentioned washer and is located nearer to the crown than the other additional washer. The other additional washer is oriented oppositely from the first-named washer and abuts the side of the groove remote from the crown. Both of the additional washers are stressed towards a planar configuration.

The invention also contemplates a method of manufacturing such a piston and includes the steps of providing a ring band insert, abutting the ring band insert with the minor base of a frusto-conical washer to stress the washer, placing the resulting assembly, with the washer stressed, in a piston mold with the washer adjacent the crown forming portion of the mold, and casting a piston in the mold.

The method contemplates that the step of casting be followed by the step of machining a peripheral, piston ring receiving groove in the insert.

A highly preferred embodiment of the invention contemplates that the step of abutting the washer and the insert be performed by clamping the insert and the washer together and that the placing of the assembly in the mold includes the step of placing the assembly with the clamp in place in the mold. The clamp is then machined off of the piston assembly resulting from the step of casting.

In one embodiment of the invention, the step of providing a ring band insert structure is performed by providing two additional frusto-conical washers.

Other objects and advantages will become apparent from the following specification taken in connection with the accompanying drawings.

DESCRIPTION OF THE DRAWINGS

FIG. 1 is a fragmentary, sectional view of a piston made according to one embodiment of the invention;

FIG. 2 is an enlarged, fragmentary section of the piston construction just prior to the completion of its fabrication;

FIG. 3 is a fragmentary, exploded view of certain piston components during an early stage of the fabrication of a piston;

FIG. 4 is an enlarged, fragmentary section of a modified embodiment of a piston made according to the invention; and FIG. 5 is a view similar to FIG. 3 but of the embodiment illustrated in FIG. 4.

DESCRIPTION OF THE PREFERRED EMBODIMENT

An exemplary embodiment of a piston made according to the invention is illustrated in the drawings and, with reference to FIG. 1, is seen to include a piston body 10 having an upper crown 12 and a lower, depending skirt 14. The crown 12 is provided with a combustion crater 16, while the skirt 14 is hollow as at 18 for receipt of a wrist pin and a connecting rod in a conventional fashion.

Intermediate the crown 12 and the skirt 14 in the piston body 10 is a peripheral groove 20 for receipt of an oil ring or the like. Closely adjacent the crown 12 is a groove 22 which receives a ring groove band insert 24 having a peripheral groove 26 for receipt of a compression ring. While the insert 24 is shown as having but a single groove 26, it is contemplated that additional grooves may be provided depending upon the number of compression rings to be employed in the piston assembly.

The groove 22 is also occupied by a plurality of frusto-conical washers 28 which are stressed to store energy to force the insert 24 toward the skirt 14 to preclude its loosening during engine operation.

The washers 28 may be so-called Belleville washers and are so disposed in the groove 22 so as to have their minor bases directed toward the skirt 14 and their major bases directed toward the crown 12. (The reference to the minor base and major base of the washers 28 is directed to the bases of the envelope containing the washers 28 when in an unstressed condition. In other words, the major base will be on the concave side of the washer, while the minor base will be on the convex side.)

As a result of the foregoing construction, the stored energy resulting from the stressing of the washers towards a planar conditiofn will be applied principally at the radially innermost side 30 of the insert 24. The purpose of this construction is to eliminate any tendency towards collapsing the insert 24 in the area of the groove 26. Preferably, the washers 28 are stressed to assume a substantially planar condition. However, those skilled in the art will appreciate that, depending upon the configuration of the uppermost side of the insert 24, the washers 28 need not be stressed to a planar condition but merely stressed towards a planar condition until the desired amount of loading force is achieved.

Turning to FIGS. 2 and 3, the manner in which the piston assembly is fabricated will be described.

Three frusto-conical washers 28 are oriented such that their major bases 32 are remote from the ring band insert 24 and their minor bases 34 are facing the insert 24. The lowermost one of the washers 28 will have its minor base 34 abutting the upper side of the insert 24. The washers 28 will then be stressed to the desired extent and a C-shaped clamp 36 applied to the washers and the insert 24 to assemble the elements together in a stressed condition. The resulting assembly is then placed in a piston-forming mold with the major bases 32 of the washers 28 directed toward the crown-forming portion of such a mold and the lowermost side of the insert 24 directed toward the skirt-forming portion of such a mold. The clamp 36 remains with the assembly of the insert 24 and the washers 28 when placed in the mold and maintains the assembly stressed during molding.

The piston body forming material is then introduced into the mold and after the same has solidified, the piston assembly is then removed. At this time, the sides of the piston may be finish machined and such machining will machine the clamp 36 off the piston body. Alternately, if the clamp is segmented, it may be pried off the body and reused. Thereafter, the groove 26 may be machined in the insert 24 as illustrated in dotted lines in FIG. 2.

As a consequence, substantial energy will be stored in the assembly and, in particular, the stressed washers 28 and will be directed against the inserts 24 to hold the same against the lowermost end of the groove 22.

FIGS. 4 and 5 illustrate a modified embodiment of the invention. In the embodiment illustrated in FIGS. 4 and 5, a plurality of the frusto-conical washers 28 are employed in the same manner as mentioned above. However, the insert is fabricated from two additional frusto-conical washers 40 and 42 which sandwich a spacer 44. As illustrated in FIG. 5, the spacer 44 is formed of a ring 46 having a T-shaped section and a ring-shaped shim 48. However, it is to be understood that, if desired, the two could be formed integrally.

The additional washer 40 is located closer to the crown 12 than the washer 42 and is oriented similarly to the washers 28. Conversely, the washer 42 abuts the lowermost side wall 50 of the groove 22 and is oriented oppositely from the washers 28 and 40. That is, its minor base 52 is directed toward the crown 12 while its major base 54 is directed toward the skirt 14.

The washers are then stressed in the same manner mentioned in connection with the embodiment illustrated in FIGS. 1-3 using a C-shaped clamp, not shown. The piston is then formed according to the same steps as set forth in connection with the embodiment of FIGS. 1-3.

After the piston is removed from the mold, the clamp (not shown) may be removed by machining and a groove 56 is then machined principally in the spacer 44 and, to a small extent, in the lower and upper surfaces of the washers 40 and 42, respectively, as illustrated in FIG. 4.

To preclude loosening of the bands during machining of the body, the radially inner surfaces of the components may be serrated as at 60.

It is to be specifically noted that a portion of the spacer 44 remains in place and that the stressing forces are principally directed against such remaining portion by reason of the previously described orientation of the washers 28 prior to assembly.

From the foregoing, it will be appreciated that a piston assembly made according to the invention fully ensures that the ring groove band insert will not loosen during operation of the engine in which the piston is employed. Any desired degree of stressing can be obtained through suitable selection of the washers.

It will also be observed that the unique orientation of the washers precludes the collapse of the insert in that the stressing forces are principally directed against the innermost end thereof.

What is claimed is:
1. An improved piston construction, comprising:
a cast piston body having a crown and a depending skirt;
a peripheral groove about said body intermediate said crown and said skirt and closely adjacent said crown;
a grooved insert band having a serrated radially inner surface and cast in said groove and adapted to receive at least one piston ring; and
at least one frusto-conical washer cast in said groove abutting said insert band on the side thereof closest said crown, said washer having its minor base directed toward said skirt and its major base directed toward said crown and being stressed toward a planar configuration to store energy to tightly clamp said insert band within said groove;
said insert band being defined by two additional frusto-conical washers and an interposed spacer, one of said additional washers being oriented in said groove identically to said first named washer and being located nearer to said crown than the other additional washer, said other additional washer being oriented oppositely from said first named washer and abutting the side of said groove remote from said crown, both said additional washers being stressed toward a planar configuration.

2. A method of manufacturing a piston having a piston body with a crown, a depending skirt and a stressed ring band insert comprising the steps of:
  (a) providing a ring band insert;
  (b) abutting the ring band insert with a frustoconical washer to stress the washer;
  (c) placing the resulting assembly, with the washer stressed, in a piston mold with the washer adjacent the crown forming portion of the mold; and
  (d) casting a piston to said ring band insert and washer in the mold.

3. The method of claim 2 wherein step (d) is followed by the step of machining a peripheral, piston ring receiving groove in said insert.

4. The method of claim 2 wherein step (b) is performed by clamping the insert and the washer together and step (c) includes the step of placing the assembled insert and washer and clamp in the mold; and further including the step of machining the clamp off the piston assembly resulting from step (d).

5. The method of claim 2 wherein step (a) is performed by providing two additional frusto-conical washers having their minor bases sandwiching a spacer.

6. The method of claim 5 wherein step (d) is followed by the step of machining a peripheral groove in said additional washers and said spacer.

7. An improved piston construction, comprising:
  a piston body having a crown and a depending skirt;
  a grooved insert band cast in said body adjacent said crown and adapted to receive at least one piston ring; and
  at least one frusto-conical washer abutting said insert band and cast in said body, said washer being stressed toward a planar configuration to store energy to tightly hold said insert band within said body.

8. The piston of claim 7 wherein said washer abuts the side of said band insert adjacent said crown.

9. The piston of claim 7 wherein the minor base of the washer abuts radially innermost side of the band.

10. A method of manufacturing a piston having a piston body with a crown, a depending skirt and a stressed ring band insert comprising the steps of:
  (a) providing a ring band insert;
  (b) abutting the ring band insert at its radially innermost side with the minor base of a frustoconical washer and stressing the washer against the insert;
  (c) placing the resulting assembly, with the washer stressed, in a piston mold with the washer adjacent the crown forming portion of the mold; and
  (d) casting a piston to said ring band insert and washer in the mold.

11. An improved piston comprising:
  a piston body having a crown and a depending skirt;
  a grooved insert band extending about said skirt and adapted to receive at least one piston ring;
  a plurality of frusto-conical washers in stacked relation and having their minor bases directed toward said skirt and their major bases directed toward said crown, the minor base of an endmost washer in said stack engaging said band substantially at the radially innermost side thereof, said washers being stressed towards a planar configuration;
  said band and said washers being cast within said piston body with said washeres stressed so that said washers apply a force against said band to prevent said band from loosening from said body.

12. The piston of claim 11 wherein the radially inner surfaces of said band and said washers are serrated.

* * * * *